Figure 1:
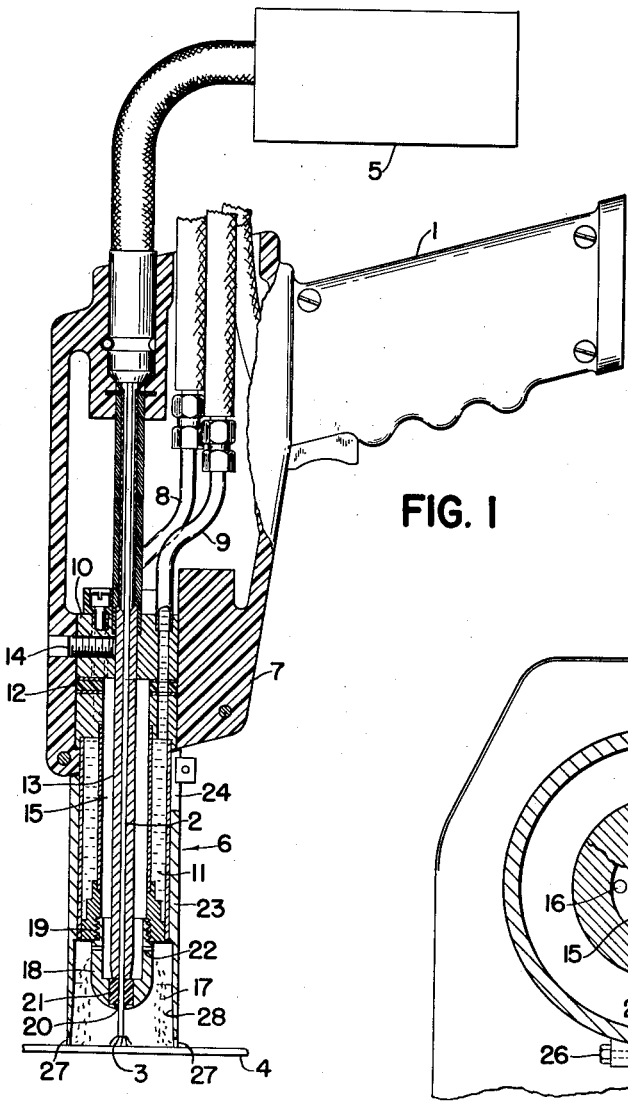

July 31, 1962

G. R. WEPFER 3,047,714

ARC WELDING APPARATUS

Filed May 12, 1959

2 Sheets-Sheet 1

INVENTOR.
GEORGE R. WEPFER
BY
*Andrews + Starke*
Attorneys

July 31, 1962 G. R. WEPFER 3,047,714
ARC WELDING APPARATUS
Filed May 12, 1959 2 Sheets-Sheet 2
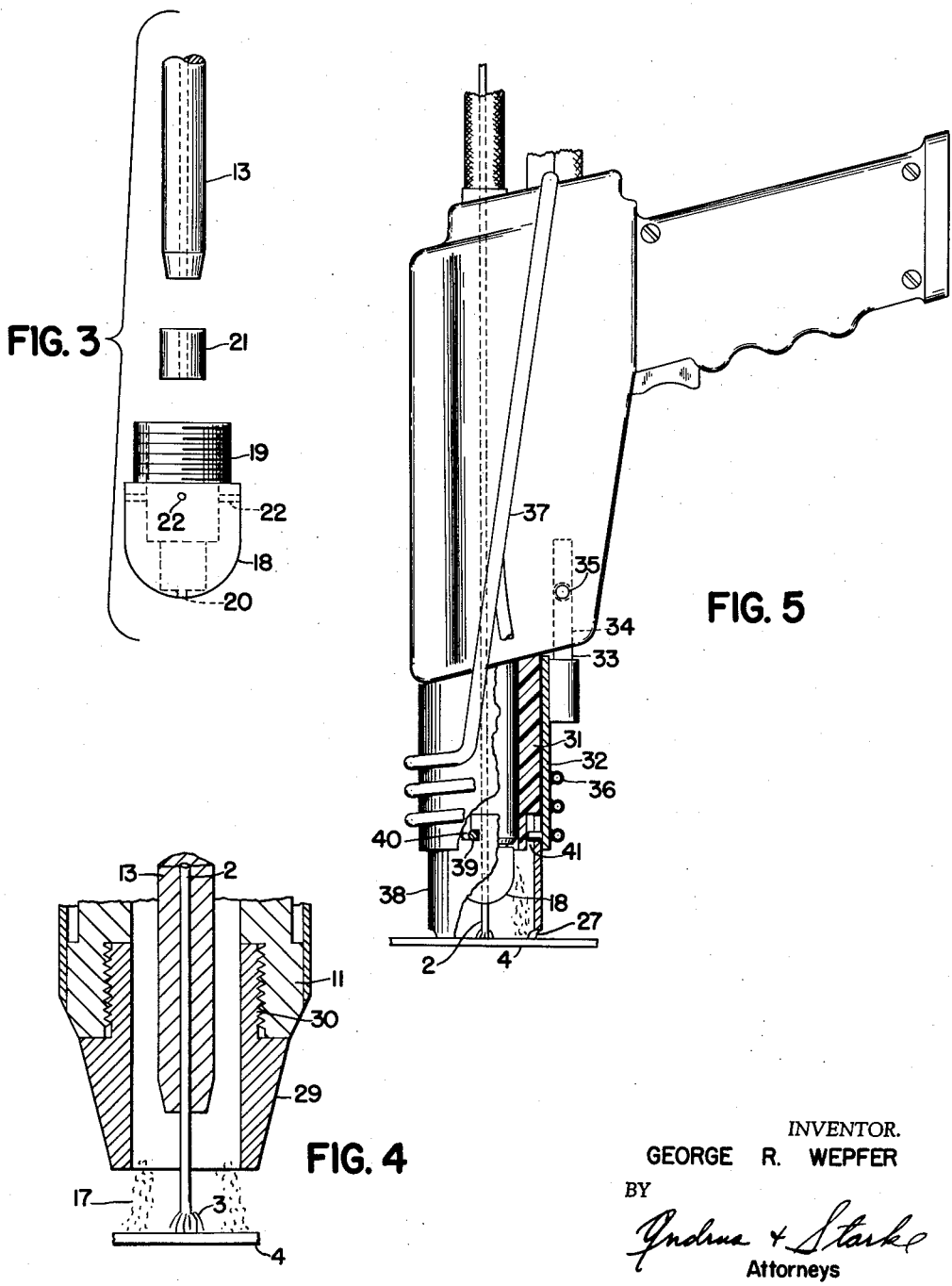
INVENTOR.
GEORGE R. WEPFER
BY
Andrus & Starke
Attorneys United States Patent Office 3,047,714
Patented July 31, 1962

3,047,714
ARC WELDING APPARATUS
George R. Wepfer, Milwaukee, Wis., assignor to A. O. Smith Corporation, Milwaukee, Wis., a corporation of New York
Filed May 12, 1959, Ser. No. 812,626
9 Claims. (Cl. 219—127)

This invention is directed to gas-shielded consumable electrode arc welding apparatus which is readily adapted for both spot welding and continuous welding.

In gas-shielded arc welding a consumable electrode is continuously driven to and consumed in an arc to deposit the electrode as a part of the weld bead. A shielding gas is fed concentrically of the electrode to establish a protective envelope about the arc to shield the weld from the surrounding atmosphere.

Consumable-electrode gas-shielded arc welding processes are widely employed for depositing a continuous extended weld. The process has also been employed for depositing localized or spot welds wherein the electrode is not laterally moved relative to the workpiece.

The spot welding apparatus is generally similar to the conventional apparatus. However, a tubular shield is normally provided which engages the work to enclose the weld area and protect the welder against the arc flash.

Generally, the gas passage in the welding apparatus encircles the electrode and is connected to a suitable source of gas through inline openings in the back portion of the apparatus.

In gas-shielded arc welding, particularly where carbon dioxide ($CO_2$) gas is employed, a substantial amount of weld spatter is created by the force of the arc. The spatter has a tendency to fly into the gas passage and interferes with the flow of gas to the arc. This is particularly true in spot welding guns where the encircling shield tends to direct the spatter into the gun.

In accordance with the present invention, a gas cup is employed adjacent the discharge end of the electrode to seal off the conventional annular gas passage. Suitable gas ports in the gas cup discharge the gas immediately adjacent the arc. The immediate discharge of the gas reduces the arc spatter and substantially eliminates the usual interference of the gas flow. An insulating medium is interposed between the electrode and the contact tube and the gas cup to electrically isolate the gas cup and the outer portions of the apparatus. The insulating medium thus eliminates the danger of electrical shock and also prevents shorting of the weld current from the arc when an arc shield is disposed in engagement with the work.

The present invention is readily adapted to existing arc welding hand guns and the like wherein a nozzle tip is removably secured to the discharge end of a nozzle. In accordance with the present invention, the nozzle tip is removed and replaced with a gas cup constructed in accordance with the present invention. A tubular shield or the like is secured to the gun encircling the nozzle to convert from the standard gas-shielded arc welding apparatus to a spot welder.

In accordance with another aspect of the invention, an insulating medium is disposed between the conventional nozzle and the spot welding tubular shield to establish a second insulation barrier. If spatter builds up from the gas cup to the electrode, the second insulation barrier maintains the outer surfaces of the gun at ground potential.

The present invention thus provides a consumable electrode arc welding apparatus which is readily adapted for continuous extended welding and for spot welding. The construction is simple and is therefore low in initial cost and maintenance.

The drawings furnished herewith illustrate the best mode presently contemplated for carrying out the invention.

Figure 2:
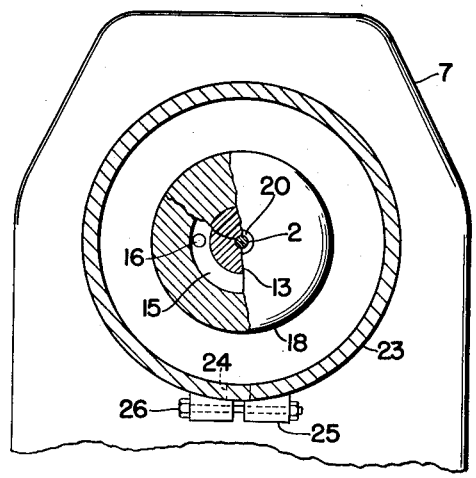

In the drawings:
FIGURE 1 is a side elevational view of a consumable-electrode arc-welding gun, with parts broken away and sectioned to show the details of the gun;
FIGURE 2 is a front elevational view with parts broken away;
FIGURE 3 is an enlarged exploded view of certain components shown in FIGURES 1 and 2;
FIGURE 4 is a fragmentary view of a portion of the gun shown in FIGURE 1 with the gun adapted for depositing an elongated weld; and
FIGURE 5 is a side elevational view similar to FIGURE 1 showing an alternative construction in accordance with another aspect of the present invention.

Referring to the drawings and particularly to FIGURES 1–3, an arc welding gun 1 is disposed to continuously direct a consumable electrode 2 to an arc 3 which is established between the end of the electrode 2 and a workpiece 4. A suitable automatic control, electrode feed and power source 5, shown diagrammatically in block form, is connected to the arc welding gun 1 to establish automatic feed of the electrode and energization of other functioning parts of the gun apparatus.

The illustrated arc welding gun is generally similar to the gun shown in the co-pending application of Julian Piekarski et al. entitled "Arc Welding Gun," Serial No. 631,849, which was filed on December 31, 1956 now Patent No. 2,903,567, issued September 8, 1959. The illustrated gun for spot welding in accordance with the present invention is described in such detail as to fully and clearly explain a preferred embodiment of the invention. For other details of construction reference may be made to the cited patent application.

Generally, the gun 1 comprises a forward nozzle assembly 6 releasably secured within the forward portion of a pistol shaped insulating handle 7. The electrode 2 is fed through the rear portion of the insulating handle 7 and through the forward nozzle assembly 6 to the arc 3. A gas line 8 and a combined incoming water and power connecting line 9 and a water discharge line, not shown, are entered through the rear end of the insulating handle 7 and are connected to a supporting and connecting member 10 of the forward nozzle assembly 6 to simultaneously supply current, shielding gas and cooling water to the nozzle assembly 6, such as shown in the previously referred to Piekarski et al. patent application.

The present invention is specifically concerned with the construction of the forward nozzle assembly 6 and is more particularly concerned with the ready adaptation of a conventional arc welding gun to spot welding.

The forward nozzle assembly 6 includes a tubular double-walled metal jacket 11 which is connected to the supporting member 10 adjacent the back end of the nozzle assembly 6 and within the handle 7. The water jacket 11 is connected to the incoming water line 9 and serves to carry away the heat generated in the arc and transmitted to the component of the gun and thereby prevents destruction of the gun. Suitable insulation 12 electrically insulates the water jacket 11 from the member 10. Although the cooling water serves as an electrically conductive path, the resistance is sufficiently high to maintain electrical isolation of the jacket.

A tubular contact 13 is coaxially secured within the tubular water jacket 11 to the electrode contact block 10 by an adjustable set screw 14 which threads through the contact block and bears against the contact tube. The outer surface of the contact tube 13 is spaced from the inner wall of the water jacket 11 and defines a gas passage 15 which is connected to the gas line 9 by opening 16 to the contact block 10. Shielding gas 17 is simultaneously supplied with the cooling water and the feeding of the electrode 2 to shield the arc 3 from the surrounding atmosphere.

A metallic gas cup 18 is releasably secured to the forward end of the water jacket 11 to substantially seal off the annular gas passage 15. The outer surface of gas cup 18 and the internal end surface of the water jacket 11 are correspondingly threaded as at 19 to establish a releasable and rigid coupling with the gas cup extending forwardly toward the arc 3. The base of the metallic cup 18 is provided with a central aperture 20 in alignment with the contact tube 13. The aperture 20 is substantially larger than the diameter of the electrode 2 to allow passage of the electrode through the gas cup 18 without engaging the gas cup.

A tubular insulator 21 is mounted within an enlargement of the back portion of the aperture 20 and is provided with an axial opening aligned with the contact tube 13 and aperture 20.

The diameter of the insulator 21 opening generally corresponds to the diameter of the electrode 2 and the contact tube opening to serve as a continuation of the contact tube. The insulator serves to maintain the gas cup 18 and nozzle water jacket 11 electrically neutral and to direct the electrode 2 through the gas cup 18 and to the arc 3.

The insulator 21 is formed of any electrical insulating and preferably wear resistant material. A highly satisfactory material is diamonite which is highly wear resistant.

The insulator 21 is clamped against an encircling lip within the gas cup 18 by the outer end of the contact tube 13 when the gas cup 18 is securely threaded into the water jacket 11.

A plurality of circumferentially distributed and radially extending gas passages 22 are formed in the gas cup in slightly spaced relation to the threaded portion to allow the shielding gas to flow from the annular passage 15.

A tubular metallic shield 23 encircles the gas cup 18 to direct the escaping shielding gas downwardly to the arc 3.

The tubular shield 23 is releasably secured about the water jacket 11 and extends forwardly into engagement with the work 4. An axially projected slot 24 is provided in the back edge of the shield 23. Lugs 25 are secured to opposite sides of slot 24 and a nut and bolt assembly 26 releasably passed therethrough to establish a C-type clamp which when drawn up rigidly, releasably connects the shield 23 to water jacket 11. The inner diameter of the tubular shield 23 closely approximates the outer diameter of the water jacket 11 to establish a tight slip fit. Consequently, the cooling water flowing through the water jacket 11 serves to cool the gas shield 23 and prevents destruction of the work engaging end of the shield.

The forward end of the tubular shield 23 extends forwardly of the gas cup 18 and engages the work surface, as shown in FIG. 1. A series of edge openings or recesses 27 are formed in the outer end of the tubular shield to allow the shielding gas to escape. The encircling tubular gas shield 23 not only directs the shielding gas 17 to the area immediately adjacent the arc 3 but also encloses the arc flash and eliminates the necessity of shielding the welder's eyes by the conventional arc welding helmet.

The portion of the shield 23 extending forwardly of the gas cup 18 is counterbored to establish a suitable gas passage 28 immediately adjacent the gas cup ports 22.

In operation, the gas cup 18 and tubular outer shield 23 are releasably secured to the welding nozzle as shown in FIG. 1. The gun 1 is held with the outer end of the tubular shield 23 concentrically engaging the work 4 about the center of the spot at which a weld is to be deposited. The control unit 5 is connected to a suitable source of power, and to a suitable shielding gas and a cooling water supply. The trigger of the hand gun 1 is actuated to simultaneously supply power shielding gas and cooling water to the corresponding elements in the gun and to establish a feed of the electrode 2. The control 5 normally includes an automatic timer, not shown, such that the electrode 2 is automatically fed to the weld area for a preselected time after each actuation of the gun trigger.

The gas cup 18 effectively seals off the annular gas passage 15 and prevents spatter from building up in the passage. The small diamonite or other insulating insert 21 maintains the gas cup 18 and consequently the water jacket 11 substantially electrically neutral. The outer shield 23 is therefore neutral and engagement with the work does not establish a short circuit about the arc 3 from the contact tube 13 to the work 4. Furthermore, there is no shock hazard to the arc welder because of accidental contact with the nozzle assembly 6.

The C-clamp assembly formed by the lugs 25 and the bolt and nut assembly 26 allows ready removal and replacement of the tubular shield 23 having an end configuration in accordance with the configuration of the work surface. Thus, if a spot weld is to be deposited between a pair of surfaces disposed at right angles, the tubular shield 23 is replaced with one having the outer end formed to mate with the two adjacent or perpendicular surfaces. The shield 23 then maintains the enclosure of the arc area during a spot welding operation.

The illustrated gun is readily adapted to deposit a conventional extended weld, as shown in FIG. 4. The tubular shield 23 is removed and the gas cup 18 replaced by a conventional gas shield nozzle tip 29. The nozzle tip 29 includes a threaded shank 30 which releasably threads into the water jacket 11.

The electrode contact tube 13 is releasably held within the contact block 10 in the insulating gun handle 7 to allow axial positioning of the contact tube. In interchanging between the conventional gun construction shown in FIGURE 4 and the spot welding gun construction shown in FIGURE 1, the gas cup 18 requires changing of the location of the contact tube 13 with respect to the work 4. The setscrew 14 allows ready and simple positioning of the contact tube 13.

An alternative construction generally corresponding to that of FIGURES 1 and 3 is shown in FIGURE 5. The corresponding elements in the embodiment shown in FIGURE 5 and that of FIGURES 1–3 are given corresponding numbers for purposes of simplicity and clarity of explanation.

In the illustrated embodiment of FIGURE 5, a secondary insulating member 31 is concentrically secured about the water jacket 11 within a tubular support 32.

An axial extending rod 33 is secured to the undersurface of the tubular support 32 and projects rearwardly into a suitable opening 34 in the front wall of the gun handle 7. A suitable cross bolt unit 35 is mounted within the handle 7 transversely of the opening 34 and is adapted for external actuation to securely clamp the rod 33 to the handle 7 for example as shown in the previously referred to application of Julian A. Piekarski et al.

A water coil 36 is brazed or otherwise secured to the outer surface of the support 32 to water cool the support. The coil 36 is connected by a pair of jumper conduits 37 in series with the incoming water line 8 and the water jacket 11.

A releasable forward shield 38 extends forwardly into engagement with the work 4. The shield 38 is removably secured to the front end of the support 32 by a bayonet type attachment comprising a plurality of circumferentially distributed pins 39 secured to the inner diameter of the support 32 and correspondingly spaced L-shaped openings 40 provided in the inner end of the shield 38. The shield 38 may thus be readily changed for different welding locations. A tight fit is established between the shield 38 and the support 32 to couple the shield 38 to the cooling coil 36 and dissipate the heat of the arc 3 from the shield 38.

The insulating member 31 constitutes a secondary barrier to electrical connection of the shield 38 and support 32 to contact tube 13.

The forward portion of the tubular insulator 31 is recessed as at 41 to receive the back end of the incoming shield 38. The insulator 31 is clamped against the front of the gun handle 7 by the back edge 42 of the gas shield 38.

Generally, the operation of the embodiment of the invention illustrated in FIG. 5 is similar to that shown in FIGS. 1–3. However, insulating member 31 prevents electrical connection of the electrode to the outer surfaces of gun if weld spatter should build up across the insulating insert 21 in the gas cup 18.

The insulator 31 interferes with the cooling of the shield 38 by the water jacket 11. The cooling coil 36 dissipates the heat and prevents destruction of the shield 38.

The present invention provides a simple and rugged spot welding apparatus which is easily maintained and operated. Conventional apparatus is readily converted to spot welding apparatus and consequently minimum capital investment is required.

Various modes of carrying out the invention are contemplated as being within the scope of the following claims particularly pointing out and distinctly claiming the subject matter which is regarded as the invention.

I claim:

1. In a gas-shielded consumable electrode apparatus having an insulating handle and a front tubular water jacket defining an annular gas passage about a contact tube coupled to the handle and insulated from the water jacket, a gas cup releasably secured to the forward end of the water jacket to substantially close said gas passage and having radial gas ports communicating with said annular gas passage, said gas cup having an axial opening larger than the diameter of the electrode and aligned with said contact tube, an insulating medium disposed between the contact tube and the gas cup to insulate the gas cup and water jacket from the electrode and the contact tube, and a metallic tubular gas shield tightly encircling said water jacket and extending forwardly of the gas cup to engage the work area during a spot welding operation, the water jacket serving to dissipate the heat energy in said shield.

2. In a gas-shielded consumable electrode apparatus having an insulating handle and a front tubular water jacket defining an annular gas passage about a contact tube coupled to the handle and insulated from the water jacket, a gas cup releasably secured to the forward end of the nozzle to substantially close said gas passage and having radial gas ports communicating with said annular gas passage, said gas cup having an axial opening larger than the diameter of the electrode and aligned with said contact tube, an insulating medium disposed between the contact tube and the gas cup to insulate the gas cup and water jacket from the electrode and the contact tube, a metallic tubular shield slidably secured about the water jacket and extending forwardly into engagement with the work, the water jacket encircling end portion of said shield being axially slotted to allow expansion of the shield diameter, and means to close said slotted end to tightly engage the water jacket to prevent excessive heating of said shield.

3. A gas-shielded consumable-electrode welding conversion unit for adapting a continuous welding unit for spot welding, said welding unit having a contact tube and a coaxially encircling tubular water jacket electrically insulated from said contact tube and defining an annular gas passage and having a nozzle tip releasably coupled to the terminal end of the water jacket, which comprises a gas cup having means for releasably coupling of the cup to the end of the water jacket in place of said nozzle tip to substantially close said gas passage, said gas cup having gas discharge openings and a central axial electrode opening having a greater diameter than said electrode, and an electrical insulator clamped between the contact tube and the gas cup incident to coupling of the gas cup to the water jacket to insulate the water jacket from said contact tube.

4. A gas-shielded consumable-electrode welding conversion unit for adapting a continuous weld depositing unit for spot welding, said weld depositing unit having a contact tube adjustably secured coaxially within a tubular water jacket and defining an annular gas passage with said water jacket and having a nozzle tip having coupling means releasably coupling the tip to the terminal end of the water jacket, which comprises a metallic gas cup having coupling means corresponding to said nozzle tip and releasably coupling the gas cup to the end of the water jacket in place of said nozzle tip, said gas cup having gas openings and an electrode opening, an insulator clamped between the contact tube and the gas cup upon coupling of the gas cup to the water jacket, and a tubular gas shield releasably clamped to the outer surface of the water jacket and extending forwardly of the gas cup to substantially enclose a weld area during a spot welding operation.

5. A gas-shielded consumable-electrode apparatus having an insulating handle and a front tubular nozzle defining an annular gas passage about a contact tube, a gas cup secured to the forward end of the nozzle and having radial gas ports communicating with said annular gas passage, said gas cup having an axial opening larger than the diameter of the electrode and aligned with said contact tube, an insulating medium disposed between the contact tube and the gas cup to insulate the gas cup from the electrode and contact tube, a tubular insulating member encircling said tubular nozzle and having an outer radial shoulder, a tubular gas shield encircling said insulating member and terminating intermediate said shoulder and the end of the insulating member, and a tubular shield tip secured within the forward end of the gas shield and clamping said insulating member in place between said insulating handle and said shield tip and extending forwardly of the gas cup into engagement with the work during a spot welding operation.

6. A gas-shielded consumable-electrode apparatus having an insulating support and a tubular water jacket extending therefrom and defining an annular gas passage about a coaxially supported contact tube, a gas cup secured to the forward end of the nozzle and having radial gas ports communicating with said annular gas passage, said gas cup having an axial opening larger than the diameter of the electrode and aligned with said contact tube, an insulating medium disposed between the contact tube and the gas cup to insulate the gas cup from the electrode and contact tube, a tubular insulating member encircling said tubular water jacket and having an enlarged back portion defining a shoulder, a tubular shield encircling said insulating member and terminating forwardly of said shoulder, radial projections on the inner surface of said shield forwardly of said shoulder, and a tubular shield tip disposed between said insulating member and said shield and being slotted to establish a bayonet-type connection with said radial projections to releasably secure the shield tip to the shield and to clamp said insulating member in place.

7. A gas-shielded consumable-electrode apparatus having an insulating support and a tubular water jacket extending therefrom and defining an annular gas passage about a coaxially supported contact tube, a gas cup secured to the forward end of the nozzle and having radial gas parts communicating with said annular gas passage, said gas cup having an axial opening larger than the diameter of the electrode and aligned with said contact tube, an insulating medium disposed between the contact tube and the gas cup to insulate the gas cup from the electrode and contact tube, a tubular insulating member encircling said tubular water jacket and having an enlarged back portion defining a shoulder, a tubular shield encircling said insulating member and terminating forwardly of said shoulder, radial projections on the inner surface of said shield forwardly of said shoulder, a tubular shield tip secured between said insulating member and said shield and being slotted to establish a bayonet-type connection with said radial projections to releasably secure the shield tip to the shield and to clamp said insulating member in place, and a cooling means secured to the outer surface of the shield to dissipate the heat in the shield and the shield tip.

8. A gas-shielded consumable-electrode apparatus having an insulating support and a tubular water jacket extending therefrom and defining an annular gas passage about a coaxially supported contact tube, a gas cup secured to the forward end of the nozzle and having radial gas ports communicating with said annular gas passage, said gas cup having an axial opening larger than the diameter of the electrode and aligned with said contact tube, an insulating medium disposed between the contact tube and the gas cup to insulate the gas cup from the electrode and contact tube, a tubular insulating member encircling said tubular water jacket and having an enlarged back portion defining a shoulder, a tubular shield encircling said insulating member and terminating forwardly of said shoulder, radial projections on the inner surface of said shield forwardly of said shoulder, a tubular shield tip secured between said insulating member and said shield and being slotted to establish a bayonet-type connection with said radial projections to releasably secure the shield tip to the shield and to clamp said insulating member in place, and a water coil encircling the tubular shield to dissipate the heat in the shield and the shield tip and being connected with said water jacket to cool the shield and shield tip.

9. A gas-shielded consumable-electrode welding gun unit, which comprises a tubular water jacket, an electrode passageway for feeding an electrode of indefinite length through the welding gun and including a contact tube defining a terminal portion of the passageway, said contact tube being coaxially secured with the water jacket and extending outwardly thereof and forming an annular gas passage with said water jacket, a tubular nozzle tip having means for releasably securing the tip to the outer end of the water jacket to form an extension of the gas passage, a gas cup having a similar coupling means for releasably securing the gas cup to the outer end of the water jacket to substantially seal the gas passage immediately adjacent the terminal end of the water jacket, said gas cup having opening means to discharge gas from said annular gas passage and having an axial electrode opening aligned with said contact tube, and an insulating medium disposed between said contact tube and said gas cup to insulate the gas cup from said electrode and said contact tube.

References Cited in the file of this patent

UNITED STATES PATENTS

| 2,468,806 | Pilia | May 3, 1949 |
| 2,817,003 | Dusek | Dec. 17, 1957 |
| 2,863,984 | Schaefer et al. | Dec. 9, 1958 |
| 2,898,445 | Slezak | Aug. 4, 1959 |
| 2,903,567 | Piekarski et al. | Sept. 8, 1959 |
| 2,951,934 | Engel | Sept. 6, 1960 |

FOREIGN PATENTS

| 798,292 | Great Britain | July 16, 1958 |